US009719235B1

(12) United States Patent
Huang et al.

(10) Patent No.: US 9,719,235 B1
(45) Date of Patent: Aug. 1, 2017

(54) FULL-DRAIN TYPE VACUUM BREAKER

(71) Applicants: Chung-Yi Huang, Lukang Township, Changhua County (TW); Hsiang-Chien Huang, Lukang Township, Changhua County (TW)

(72) Inventors: Chung-Yi Huang, Lukang Township, Changhua County (TW); Hsiang-Chien Huang, Lukang Township, Changhua County (TW)

(*) Notice: Subject to any disclaimer, the term of this patent is extended or adjusted under 35 U.S.C. 154(b) by 0 days.

(21) Appl. No.: 15/081,975

(22) Filed: Mar. 28, 2016

(51) Int. Cl.
*E03C 1/10* (2006.01)
*E03B 7/12* (2006.01)
*F16K 24/06* (2006.01)

(52) U.S. Cl.
CPC ............... *E03B 7/12* (2013.01); *F16K 24/06* (2013.01); *Y10T 137/314* (2015.04); *Y10T 137/3331* (2015.04)

(58) Field of Classification Search
CPC ........ F03B 7/12; F16K 24/06; Y10T 137/314; Y10T 137/3331
See application file for complete search history.

(56) References Cited

U.S. PATENT DOCUMENTS

| 2,202,123 | A | * | 5/1940 | Strode | E03C 1/108 137/519 |
| 2,746,477 | A | * | 5/1956 | Krause | E03C 1/102 137/218 |
| 3,343,646 | A | * | 9/1967 | Rowlands | A24C 5/478 198/457.05 |
| 6,116,271 | A | * | 9/2000 | Nickel | F16K 24/06 137/508 |
| 7,458,388 | B2 | * | 12/2008 | Huang | E03B 7/10 137/107 |
| 8,360,105 | B2 | * | 1/2013 | Cashen | F16K 24/06 137/526 |
| 8,701,222 | B2 | * | 4/2014 | Shin | E03D 9/08 4/420.4 |
| 2005/0178434 | A1 | * | 8/2005 | Yang | F16K 24/06 137/218 |
| 2013/0341918 | A1 | * | 12/2013 | Yeh | E03B 7/12 285/355 |
| 2015/0000771 | A1 | * | 1/2015 | Chuang | F16L 29/00 137/535 |

* cited by examiner

*Primary Examiner* — Craig Schneider
*Assistant Examiner* — Kevin Barss
(74) *Attorney, Agent, or Firm* — Alan D. Kamrath; Kamrath IP Lawfirm, P.A.

(57) ABSTRACT

A vacuum breaker includes a safe valve body and an elastic gasket. The safe valve body has a receiving space which has a periphery provided with connecting holes. The elastic gasket has a size smaller than that of the receiving space, with clearances being defined between the elastic gasket and the receiving space. The elastic gasket has a center provided with a through hole and has an outer periphery provided with a sealing portion. Thus, the sealing portion contracts inward when water stops passing the safe valve body, so that ambient air flows into the receiving space to break a vacuum state in the safe valve body, such that a fluid contained in the safe valve body flows through the clearances between the elastic gasket and the safe valve body, and is drained outward from the connecting holes.

4 Claims, 5 Drawing Sheets

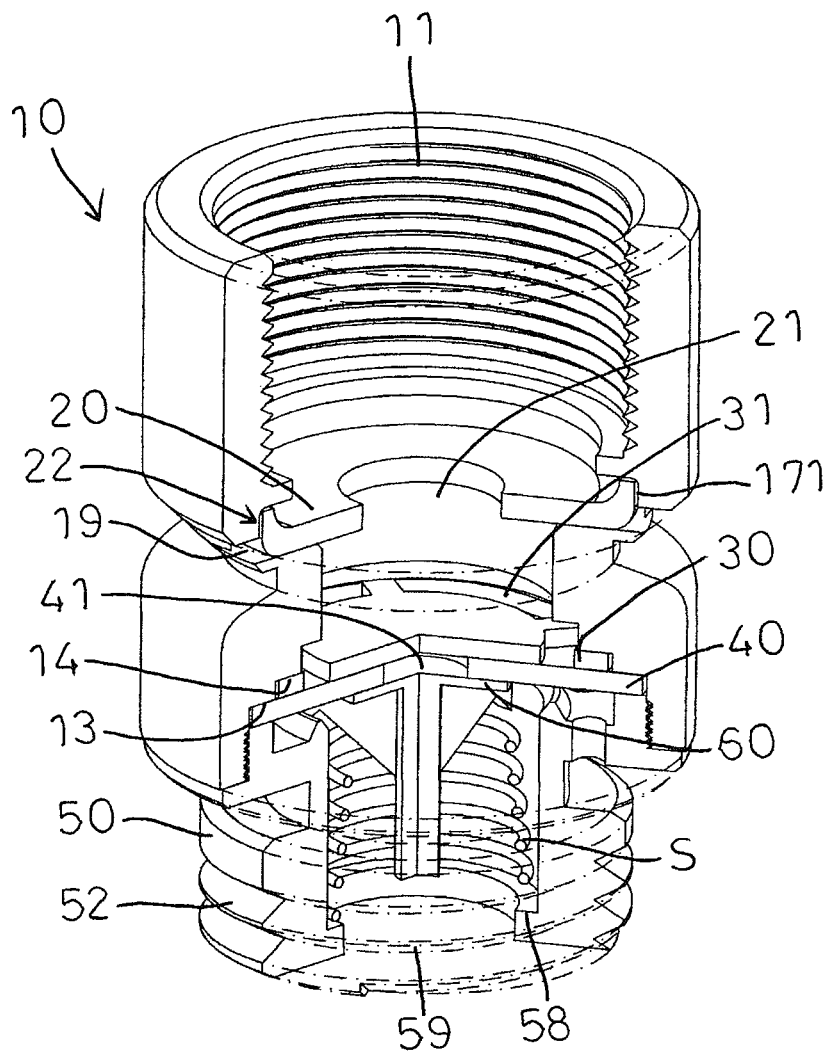
FIG·1

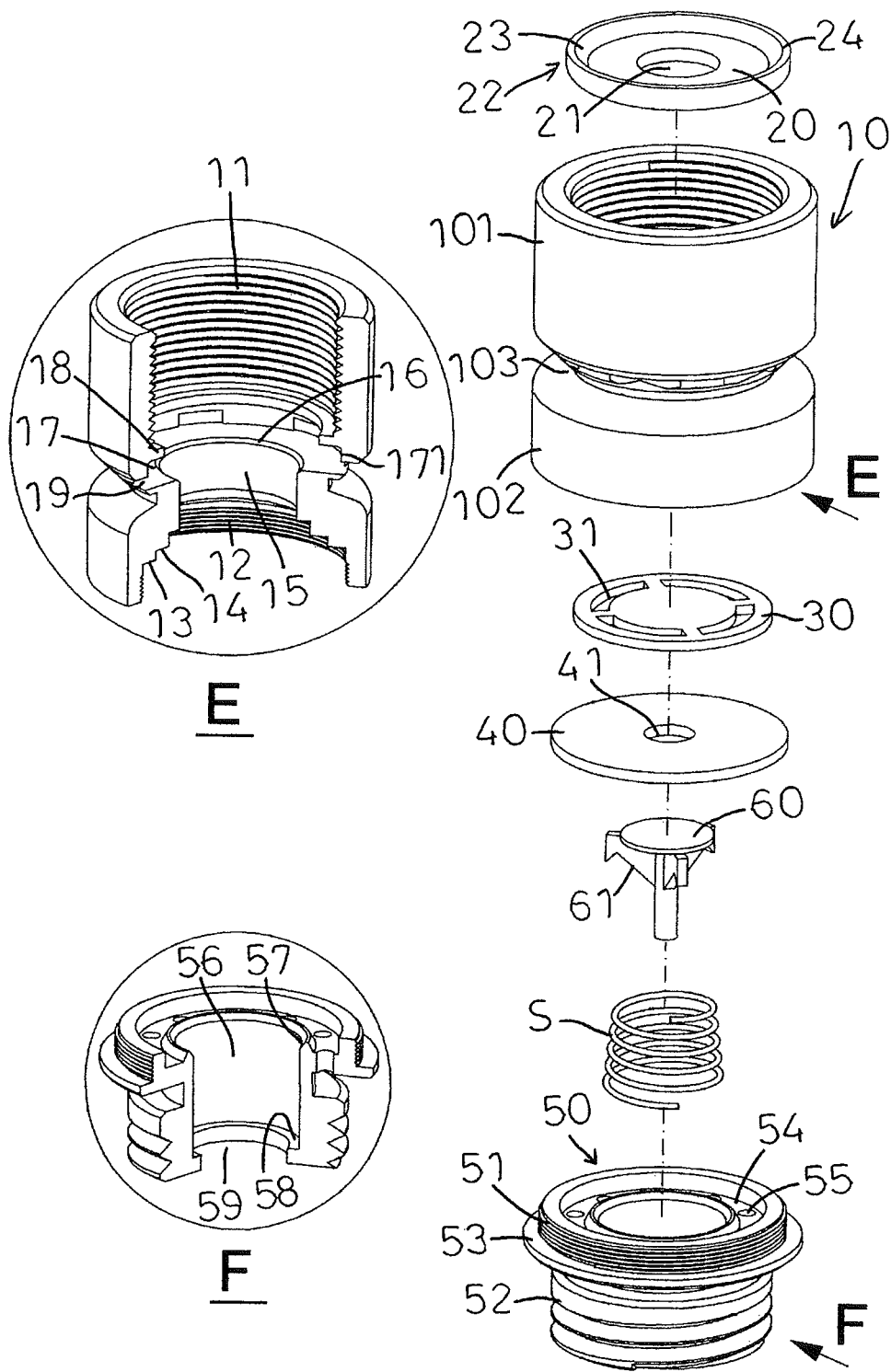
FIG·2

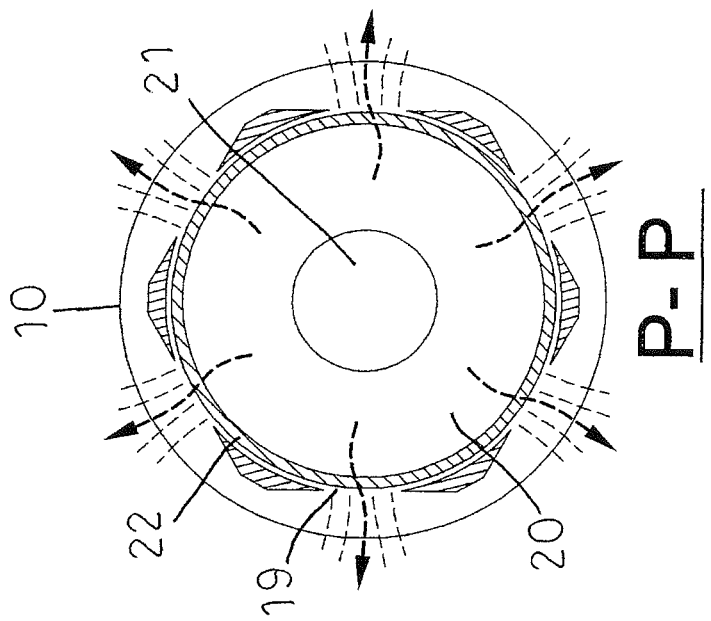
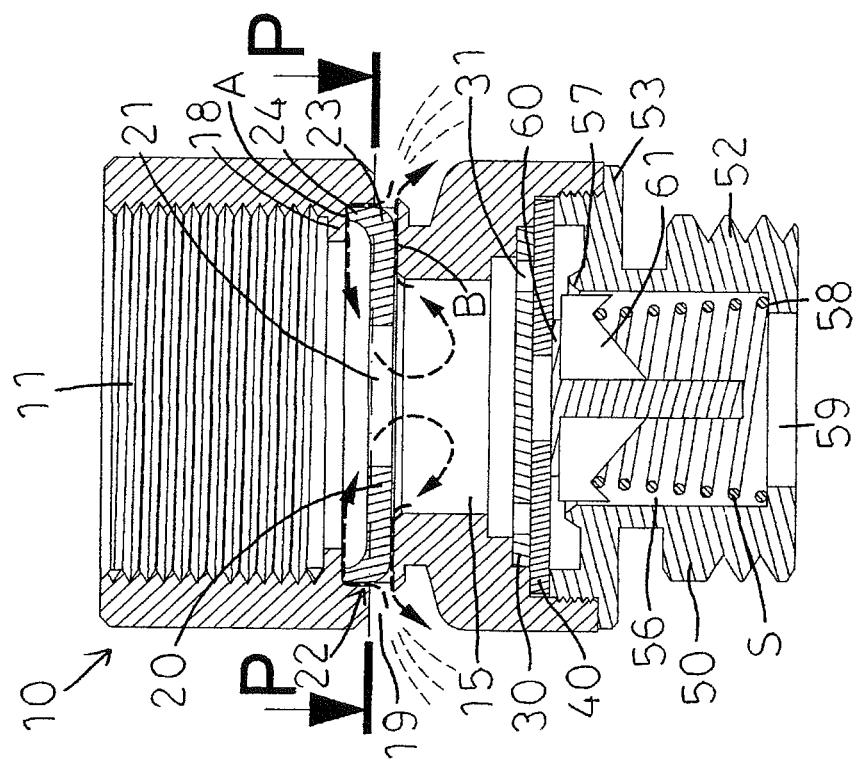
FIG. 6
FIG. 5

FULL-DRAIN TYPE VACUUM BREAKER

BACKGROUND OF THE INVENTION

1. Field of the Invention

The present invention relates to a breaker and, more particularly, to a full-drain type vacuum breaker.

2. Description of the Related Art

A conventional automatic draining back flow preventer comprises a casing including a first tubular part, a second tubular part and a third tubular part which are made individually. The first tubular part, the second tubular part and the third tubular part are connected by internal threads and external threads. However, the first tubular part, the second tubular part and the third tubular part are made individually so that it is necessary to provide airtight gaskets in the connecting portions of the first tubular part, the second tubular part and the third tubular part so as to prevent leakage, thereby increasing the cost of fabrication.

A conventional freeze safe valve comprises a valve body mounted between two pipes. The valve body has an interior provided with an elastic member, a water stop gasket, a water inlet disk, and a washer. A braking member is mounted between the elastic member and the water stop gasket. The water inlet disk has a periphery provided with water inlets holes. The water stop gasket is provided with a water inlet bore. In practice, when water passes the valve body, the water flows through the water inlets holes of the water inlet disk and the water inlet bore of the water stop gasket. On the contrary, when the water stops passing the valve body, the water stop gasket is pushed by the elastic member and the braking member to open vent holes that are connected to the interior of the valve body, so that the ambient air can enter the pipe to drain the water contained in the pipe. However, the conventional freeze safe valve only provides an automatic water draining device on the lower pipe, and the water will still stay in the upper pipe, so that the upper pipe is easily swollen and broken when the water freezes in the winter.

BRIEF SUMMARY OF THE INVENTION

In accordance with the present invention, there is provided a vacuum breaker comprising a safe valve body, an elastic gasket, a water outlet washer, an elastic sealing gasket, a water outlet seat, a elastic member and a push member. The safe valve body includes an upper section, an intermediate section and a lower section. The lower section of the safe valve body is provided with a lower internal thread for locking the water outlet seat, a first stepped edge for receiving the water outlet washer, and a second stepped edge for receiving the elastic sealing gasket. The push member is received in the water outlet seat and abuts the elastic sealing gasket. The elastic member is received in the water outlet seat and is biased between the push member and the water outlet seat. The elastic sealing gasket is pushed by the push member and abuts the water outlet washer. The safe valve body has a center provided with a passage. The passage of the safe valve body is provided with a conical face. The intermediate section of the safe valve body has an interior provided with a receiving space. The receiving space of the safe valve body is provided with a stop edge protruding inward. The elastic gasket is received in the receiving space of the safe valve body. The receiving space of the safe valve body has an outer periphery provided with a plurality of connecting holes to allow discharge of air and fluid during a vacuum breaking process. The elastic gasket has a size smaller than that of a circumferential wall of the receiving space of the safe valve body, with clearances being defined between the elastic gasket and the circumferential wall of the receiving space of the safe valve body. The elastic gasket has a center provided with a through hole and has an outer periphery provided with a sealing portion extending upward. The sealing portion of the elastic gasket has a bottom provided with a thicker portion and a top provided with a thinner portion so that the sealing portion of the elastic gasket has an elastic force and is capable of expanding outward and contracting inward.

In practice, the sealing portion of the elastic gasket contracts inward when water stops passing the safe valve body, so that ambient air flows into the receiving space of the safe valve body to break a vacuum state in the safe valve body, such that a fluid contained in the safe valve body flows through the clearances between the elastic gasket and the safe valve body, and is drained outward from the connecting holes of the safe valve body. On the contrary, when the water passes the safe valve body, an air pressure in the safe valve body presses down the elastic gasket and the sealing portion, so that the sealing portion of the elastic gasket expands outward to seal the connecting holes of the safe valve body, thereby preventing the fluid from passing through and leaking from the connecting holes of the safe valve body, and thereby preventing the ambient air from entering the safe valve body.

According to the primary advantage of the present invention, the safe valve body has a single-piece structure that is formed integrally so as to save the cost of fabrication.

According to another advantage of the present invention, when the water input is interrupted, the fluid contained in the upper section and the lower section of the safe valve body is drained outward completely, thereby preventing the fluid from staying in the upper section and the lower section of the safe valve body, and thereby preventing the drain pipe from being broken when the fluid freezes.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 1 is a perspective cross-sectional view of a vacuum breaker in accordance with the preferred embodiment of the present invention.

FIG. 2 includes an exploded perspective view of the vacuum breaker, a perspective cross-sectional view taken along mark "E", and a perspective cross-sectional view taken along mark "F".

FIG. 5 is a schematic operational view of the vacuum breaker as shown in FIG. 3.

FIG. 6 is a cross-sectional view of the vacuum breaker taken along line P-P as shown in FIG. 5.

DETAILED DESCRIPTION OF THE INVENTION

Figure 4:
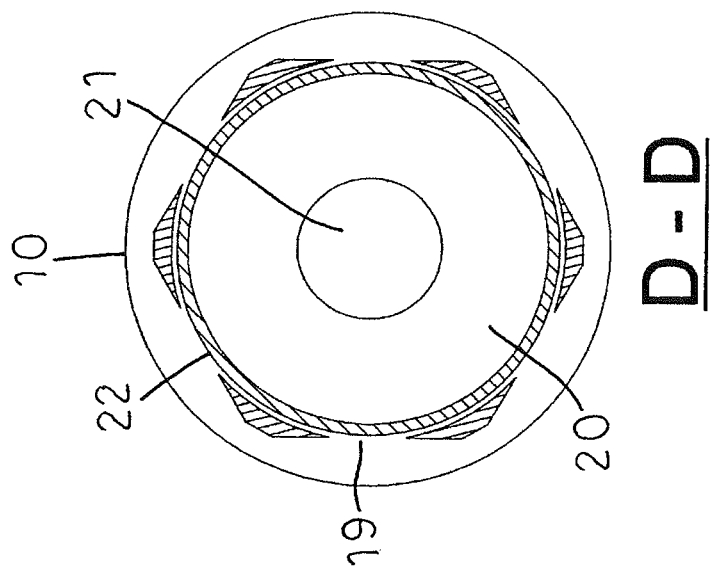
FIG. 4 is a cross-sectional view of the vacuum breaker taken along line D-D as shown in FIG. 3.
Figure 3:
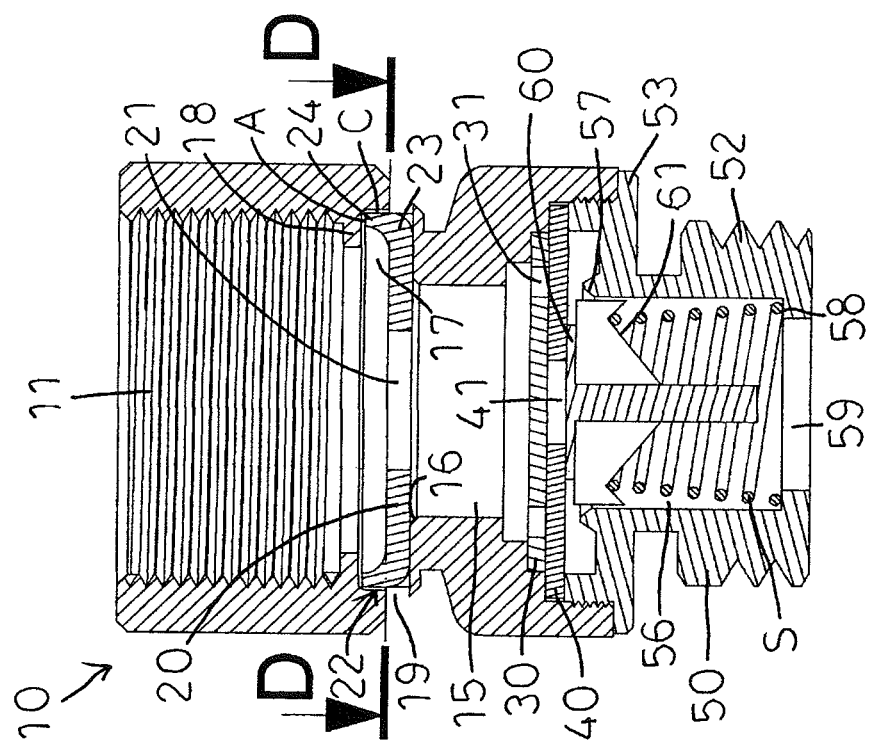
FIG. 3 is a front cross-sectional view of the vacuum breaker as shown in FIG. 1.

Referring to the drawings and initially to FIGS. 1-4, a vacuum breaker in accordance with the preferred embodiment of the present invention comprises a safe valve body 10, an elastic gasket 20, a water outlet washer 30, an elastic sealing gasket 40, a water outlet seat 50, a elastic member "S", and a push member 60.

The safe valve body 10 has a single-piece structure that is formed integrally by casting and working a blank so as to save the cost of fabrication. The safe valve body 10 includes an upper section 101, an intermediate section 103 and a lower section 102. The upper section 101 of the safe valve body 10 is provided with an upper internal thread 11. The lower section 102 of the safe valve body 10 is provided with a lower internal thread 12. The lower section 102 of the safe valve body 10 has an inner wall provided with a first stepped edge 14 and a second stepped edge 13. The second stepped edge 13 of the safe valve body 10 is disposed under and has a diameter greater than that of the first stepped edge 14. The water outlet washer 30 is received in the first stepped edge 14 of the safe valve body 10. The elastic sealing gasket 40 is received in the second stepped edge 13 of the safe valve body 10. The safe valve body 10 has a center provided with a passage 15. The passage 15 of the safe valve body 10 has an upper part provided with a conical face 16. The intermediate section 103 of the safe valve body 10 has an interior provided with a receiving space 17. The receiving space 17 of the safe valve body 10 has an upper part provided with a stop edge 18 protruding inward. The elastic gasket 20 is received in the receiving space 17 of the safe valve body 10. The receiving space 17 of the safe valve body 10 has an outer periphery provided with a plurality of connecting holes 19 to allow discharge of air and fluid during a vacuum breaking process.

The elastic gasket 20 is made of rubber material including NBR (Acrylonitrile Butadiene Rubber) which is made by Acrylonitrile and Butadiene. The elastic gasket 20 has a size slightly smaller than an inner diameter of a circumferential wall 171 of the receiving space 17 of the safe valve body 10, with clearances "A", "B" and "C" being defined between the elastic gasket 20 and the circumferential wall 171 of the receiving space 17 of the safe valve body 10. The elastic gasket 20 has a center provided with a through hole 21 and has an outer periphery provided with a sealing portion 22 extending upward. The sealing portion 22 of the elastic gasket 20 has a bottom provided with a thicker portion 23 and a top provided with a thinner portion 24 so that the sealing portion 22 of the elastic gasket 20 has an elastic force and is capable of expanding outward and contracting inward.

In practice, the sealing portion 22 of the elastic gasket 20 contracts inward at a normal state when water stops passing the safe valve body 10, so that ambient air flows through the connecting holes 19 of the safe valve body 10 and through the clearances "A", "B" and "C" between the elastic gasket 20 and the safe valve body 10 into the receiving space 17 of the safe valve body 10 to break a vacuum state in the safe valve body 10, such that a fluid contained in the safe valve body 10 flows through the clearances "A", "B" and "C" between the elastic gasket 20 and the safe valve body 10 and through the connecting holes 19 of the safe valve body 10, and is drained outward from the connecting holes 19 of the safe valve body 10, thereby preventing the fluid from staying in the safe valve body 10, and thereby preventing a drain pipe from being broken when the fluid freezes.

On the contrary, when the water passes the safe valve body 10, an air pressure in the safe valve body 10 presses down the elastic gasket 20 and the sealing portion 22, so that the sealing portion 22 of the elastic gasket 20 expands outward to seal the connecting holes 19 of the safe valve body 10, thereby preventing the fluid from passing through and leaking from the connecting holes 19 of the safe valve body 10, and thereby preventing the ambient air from entering the safe valve body 10.

The water outlet washer 30 is flush with the first stepped edge 14 of the safe valve body 10. The water outlet washer 30 has a periphery provided with a plurality of slots 31 so that the fluid flows through the passage 15 of the safe valve body 10 and evenly flows outward from the slots 31 of the water outlet washer 30.

The water outlet seat 50 has an upper part provided with an upper external thread 51 screwed into the lower internal thread 12 of the safe valve body 10 and a lower part provided with a lower external thread 52. The upper external thread 51 of the water outlet seat 50 is provided with a positioning flange 53 abutting the lower section 102 of the safe valve body 10. The upper part of the water outlet seat 50 abuts the elastic sealing gasket 40 and is provided with a recess 54 which has a bottom provided with a plurality of apertures 55 through which the air and fluid in the water outlet seat 50 is drained outward. The water outlet seat 50 has a center provided with a channel 56. The channel 56 of the water outlet seat 50 has an upper part provided with a tapered hole 57 and a lower part provided with a stepped rim 58 which extends inward and defines a water outlet hole 59.

In practice, when the water stops passing the safe valve body 10, the air and fluid in the water outlet seat 50 is drained outward from the channel 56, the tapered hole 57 and the apertures 55 of the water outlet seat 50, thereby preventing the fluid from staying in the water outlet seat 50, and thereby preventing the drain pipe from being broken when the fluid freezes.

On the contrary, when the water passes the safe valve body 10, the elastic sealing gasket 40 seals the tapered hole 57 of the water outlet seat 50, to prevent the fluid from passing through and leaking from the tapered hole 57 and the apertures 55 of the water outlet seat 50, so that the fluid flows through a gap defined between the push member 60 and the channel 56 of the water outlet seat 50 and flows outward from the water outlet hole 59 of the water outlet seat 50.

The elastic sealing gasket 40 is made of rubber material including NBR (Acrylonitrile Butadiene Rubber) which is made by Acrylonitrile and Butadiene. The elastic sealing gasket 40 is flush with the second stepped edge 13 of the safe valve body 10. The elastic sealing gasket 40 abuts the bottom of the water outlet washer 30 and has a center provided with a through bore 41.

The push member 60 is received in the channel 56 of the water outlet seat 50 and abuts the bottom of the elastic sealing gasket 40 to seal the through bore 41 of the elastic sealing gasket 40. The push member 60 has a bottom provided with a mounting portion 61.

The elastic member "S" is received in the channel 56 of the water outlet seat 50 and is biased between the push member 60 and the water outlet seat 50. The elastic member "S" has an upper end mounted on the mounting portion 61 of the push member 60 and a lower end abutting the stepped rim 58 of the water outlet seat 50.

In practice, when the water stops passing the safe valve body 10, the push member 60 is pushed upward by the elastic force of the elastic member "S", so that the elastic sealing gasket 40 is pushed upward by the push member 60 to abut the bottom of the water outlet washer 30 so as to seal the slots 31 of the water outlet washer 30.

On the contrary, when the water passes the safe valve body 10, the pressure of the fluid is greater than the elastic force of the elastic member "S", so that the fluid flows through the slots 31 of the water outlet washer 30 and the through bore 41 of the elastic sealing gasket 40 to press the push member 60.

In operation, referring to FIGS. 5 and 6 with reference to FIGS. 1-4, when the water stops passing the safe valve body 10, the elastic sealing gasket 40 is pushed upward by the elastic force of the elastic member "S" to abut the bottom of the water outlet washer 30 so as to seal the slots 31 of the water outlet washer 30. At this time, the fluid in the water outlet seat 50 is drained outward from the channel 56, the tapered hole 57 and the apertures 55 of the water outlet seat 50, thereby preventing the fluid from staying in the water outlet seat 50, and thereby preventing the drain pipe from being broken when the fluid freezes. At the same time, the sealing portion 22 of the elastic gasket 20 contracts inward, so that the ambient air flows through the connecting holes 19 of the safe valve body 10 and through the clearances "A", "B" and "C" between the elastic gasket 20 and the safe valve body 10 into the receiving space 17 of the safe valve body 10 to break the vacuum state in the safe valve body 10, such that the fluid contained in the safe valve body 10 flows through the clearances "A", "B" and "C" between the elastic gasket 20 and the safe valve body 10 and through the connecting holes 19 of the safe valve body 10, and is drained outward from the connecting holes 19 of the safe valve body 10, thereby preventing the fluid from staying in the safe valve body 10, and thereby preventing the drain pipe from being broken when the fluid freezes.

Figure 8:
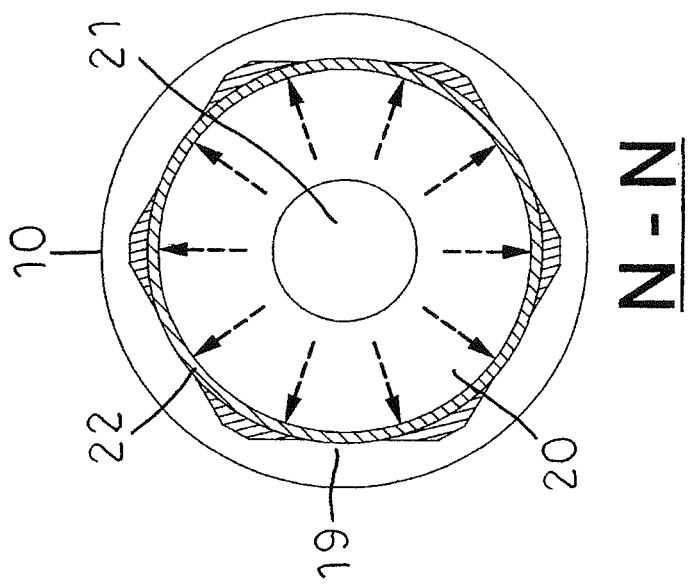
FIG. 8 is a cross-sectional view of the vacuum breaker taken along line N-N as shown in FIG. 7.
Figure 7:
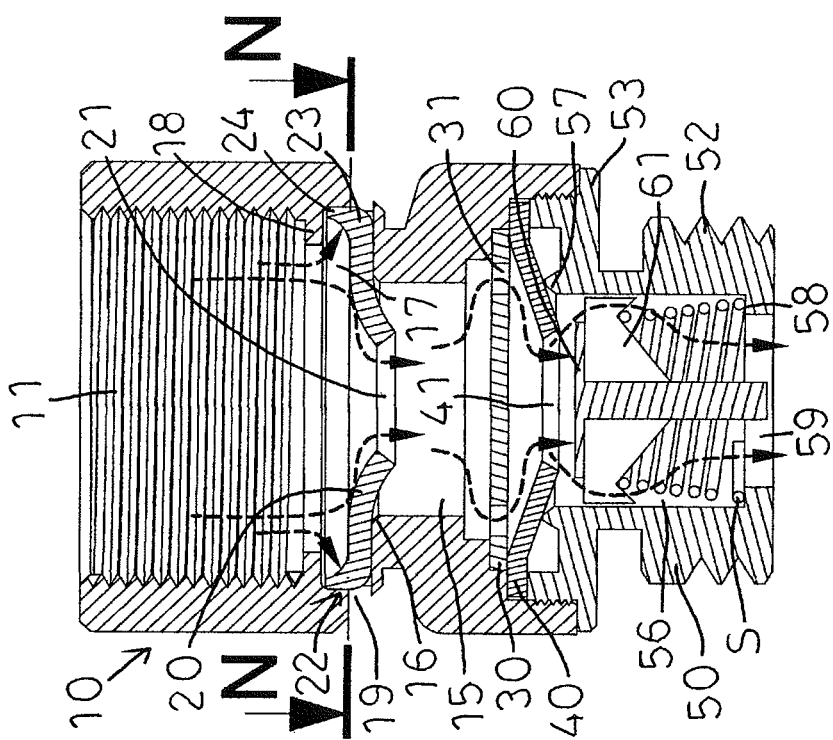
FIG. 7 is a schematic operational view of the vacuum breaker as shown in FIG. 3.

On the contrary, referring to FIGS. 7 and 8 with reference to FIGS. 1-4, when the water passes the safe valve body 10, the air pressure in the safe valve body 10 presses down the elastic gasket 20 and the sealing portion 22, so that the sealing portion 22 of the elastic gasket 20 expands outward to seal the connecting holes 19 of the safe valve body 10, thereby preventing the fluid from passing through and leaking from the connecting holes 19 of the safe valve body 10, and thereby preventing the ambient air from entering the safe valve body 10, such that the fluid in the safe valve body 10 can flow downward. At the same time, the elastic sealing gasket 40 seals the tapered hole 57 of the water outlet seat 50, to prevent the fluid from passing through and leaking from the tapered hole 57 and the apertures 55 of the water outlet seat 50, such that the fluid in the safe valve body 10 can flow downward. In such a manner, the fluid in the safe valve body 10 in turn flows through the through hole 21 of the elastic gasket 20, the slots 31 of the water outlet washer 30, the through bore 41 of the elastic sealing gasket 40, the gap between the push member 60 and the channel 56 of the water outlet seat 50 and flows outward from the water outlet hole 59 of the water outlet seat 50.

Accordingly, the safe valve body 10 has a single-piece structure that is formed integrally so as to save the cost of fabrication. In addition, when the water input is interrupted, the fluid contained in the upper section and the lower section of the safe valve body 10 is drained outward completely, thereby preventing the fluid from staying in the upper section and the lower section of the safe valve body 10, and thereby preventing the drain pipe from being broken when the fluid freezes.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A vacuum breaker comprising:
    a safe valve body, an elastic gasket, a water outlet washer, an elastic sealing gasket, a water outlet seat, a elastic member and a push member;
    wherein:
    the safe valve body includes an upper section, an intermediate section and a lower section;
    the lower section of the safe valve body is provided with a lower internal thread for locking the water outlet seat, a first stepped edge for receiving the water outlet washer, and a second stepped edge for receiving the elastic sealing gasket;
    the push member is received in the water outlet seat and abuts the elastic sealing gasket;
    the elastic member is received in the water outlet seat and is biased between the push member and the water outlet seat;
    the elastic sealing gasket is pushed by the push member and abuts the water outlet washer;
    the safe valve body has a center provided with a passage;
    the passage of the safe valve body is provided with a conical face;
    the intermediate section of the safe valve body has an interior provided with a receiving space;
    the receiving space of the safe valve body is provided with a stop edge protruding inward;
    the elastic gasket is received in the receiving space of the safe valve body;
    the receiving space of the safe valve body has an outer periphery provided with a plurality of connecting holes to allow discharge of air and fluid during a vacuum breaking process;
    the elastic gasket has a size smaller than that of a circumferential wall of the receiving space of the safe valve body, with clearances being defined between the elastic gasket and the circumferential wall of the receiving space of the safe valve body;
    the elastic gasket has a center provided with a through hole and has an outer periphery provided with a sealing portion extending upward;
    the sealing portion of the elastic gasket has a bottom provided with a thicker portion and a top provided with a thinner portion so that the sealing portion of the elastic gasket has an elastic force and is capable of expanding outward and contracting inward;
    the sealing portion of the elastic gasket contracts inward when water stops passing the safe valve body, so that ambient air flows into the receiving space of the safe valve body to break a vacuum state in the safe valve body, such that a fluid contained in the safe valve body flows through the clearances between the elastic gasket and the safe valve body, and is drained outward from the connecting holes of the safe valve body; and
    when the water passes the safe valve body, an air pressure in the safe valve body presses down the elastic gasket and the sealing portion, so that the sealing portion of the elastic gasket expands outward to seal the connecting holes of the safe valve body, thereby preventing the fluid from passing through and leaking from the connecting holes of the safe valve body, and thereby preventing the ambient air from entering the safe valve body.

2. The vacuum breaker of claim 1, wherein the safe valve body has a single-piece structure that is formed integrally by casting and working a blank.

3. The vacuum breaker of claim 1, wherein the elastic gasket is made of rubber material including NBR (Acrylonitrile Butadiene Rubber).

4. The vacuum breaker of claim 1, wherein the upper section of the safe valve body is provided with an upper internal thread.

\* \* \* \* \*